US007925130B2

(12) United States Patent
Fujii et al.

(10) Patent No.: US 7,925,130 B2
(45) Date of Patent: Apr. 12, 2011

(54) OPTICAL WAVEGUIDE, OPTICAL MODULE, METHOD OF PRODUCING OPTICAL MODULE, AND METHOD OF PRODUCING OPTICAL WAVEGUIDE

(75) Inventors: Akira Fujii, Kanagawa (JP); Toshihiko Suzuki, Kanagawa (JP); Keishi Shimizu, Kanagawa (JP); Shigemi Ohtsu, Kanagawa (JP); Kazutoshi Yatsuda, Kanagawa (JP); Masahiro Igusa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/430,698

(22) Filed: Apr. 27, 2009

(65) Prior Publication Data
US 2010/0166362 A1 Jul. 1, 2010

(30) Foreign Application Priority Data

Dec. 25, 2008 (JP) ................................. 2008-330527

(51) Int. Cl.
*G02B 6/26* (2006.01)
(52) U.S. Cl. ................. 385/37; 385/14; 385/31
(58) Field of Classification Search .................... 385/14, 385/31, 37
See application file for complete search history.

(56) References Cited

U.S. PATENT DOCUMENTS

| 7,627,018 | B1 * | 12/2009 | Guilfoyle et al. | 372/102 |
| 7,684,667 | B2 * | 3/2010 | Kim et al. | 385/49 |
| 2010/0158441 | A1 * | 6/2010 | Mickelson et al. | 385/37 |

FOREIGN PATENT DOCUMENTS

| JP | 2000-235127 A | 8/2000 |
| JP | 2004-226576 A | 8/2004 |
| JP | 2004-226941 A | 8/2004 |

* cited by examiner

*Primary Examiner* — Ryan Lepisto
*Assistant Examiner* — Eric Wong
(74) *Attorney, Agent, or Firm* — Sughrue Mion, PLLC

(57) ABSTRACT

An optical waveguide comprising: a waveguide core through which light propagates; a cladding that surrounds the waveguide core and has a refractive index that is less than the refractive index of the waveguide core; a metal layer that is formed on a surface of at least one end of the optical waveguide in a longitudinal direction, the surface being inclined so as not to be perpendicular to the longitudinal direction; and a channel that is formed at a portion of an outer surface of the cladding, the outer surface forming an acute angle with the inclined surface, and the channel being positioned such that light entering the optical waveguide adjacent the channel is reflected by the inclined surface into the waveguide core.

8 Claims, 6 Drawing Sheets

US 7,925,130 B2

OPTICAL WAVEGUIDE, OPTICAL MODULE, METHOD OF PRODUCING OPTICAL MODULE, AND METHOD OF PRODUCING OPTICAL WAVEGUIDE

CROSS-REFERENCE TO RELATED APPLICATION

This application is based on and claims priority under 35 USC 119 from Japanese Patent Application No. 2008-330527 filed Dec. 25, 2008.

BACKGROUND

1. Technical Field

The present invention relates to an optical waveguide, an optical module, a method of producing an optical module, and a method of producing an optical waveguide.

2. Related Art

In recent years, together with developments in integrated circuit technology and high-performance electronic devices, an improvement in working speed and degree of integration, and a further increase in transmission capacity and transmission speeds have been desired. In order to address the above requirements, an optical interconnection system, which uses optical wiring in place of electric wiring for data transmission among devices, boards or chips used in the devices, has attracted attention.

In the optical interconnection system, low power consumption is a required characteristic. In particular, when the optical interconnection system is to applied to mobile devices or the like, the low power consumption characteristic could be said to be the most important characteristic thereof. In order to realize low power consumption one approach may be to select an electrical device that consumes less power. However, there is also a desire for the realization of an optical module that propagates a small amount of light without a loss.

SUMMARY

According to an aspect of the invention, there is provided an optical waveguide comprising:

a waveguide core through which light propagates;

a cladding that surrounds the waveguide core and has a refractive index that is less than the refractive index of the waveguide core;

a metal layer that is formed on a surface of at least one end of the optical waveguide in a longitudinal direction, the surface being inclined so as not to be perpendicular to the longitudinal direction;

and a channel that is formed at a portion of an outer surface of the cladding, the outer surface forming an acute angle with the inclined surface, and the channel being positioned such that light entering the optical waveguide adjacent the channel is reflected by the inclined surface into the waveguide core.

BRIEF DESCRIPTION OF THE DRAWINGS

Exemplary embodiments of the present invention will be described in detail based on the following figures, wherein.

DETAILED DESCRIPTION

Figure 1A:
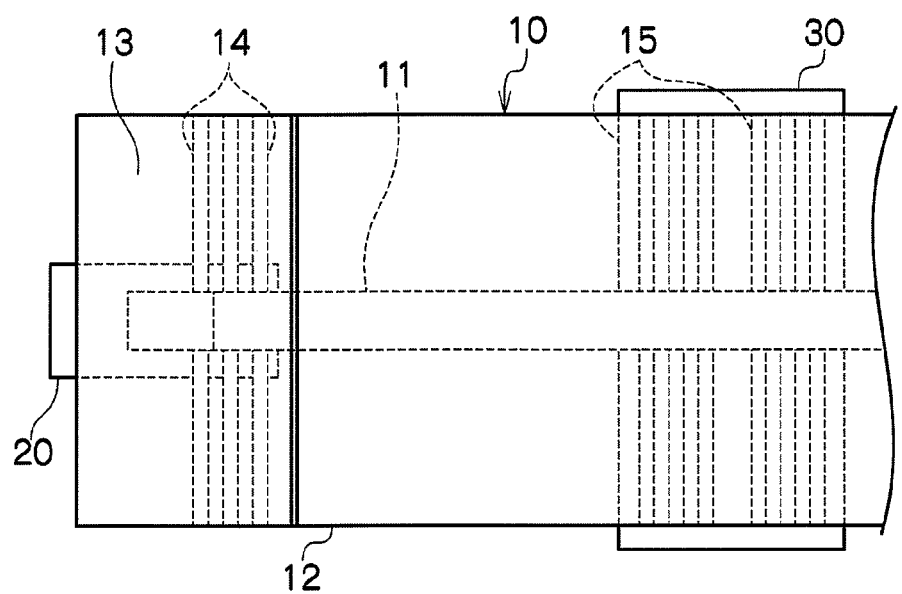
FIG. 1A is a top view of an exemplary embodiment of the optical waveguide according to the invention.

Hereinafter, the present invention will be described in detail with reference to an exemplary embodiment thereof.

An optical waveguide according to the present exemplary embodiment includes a waveguide core through which light propagates; a cladding that surrounds the waveguide core and has a refractive index that is less than the refractive index of the waveguide core; a metal layer that is formed on a surface of at least one end of the optical waveguide in a longitudinal direction, the surface being inclined so as not to be perpendicular to the longitudinal direction; and a channel that is formed at a portion of an outer surface of the cladding, the outer surface forming an acute angle with the inclined surface, and the portion being positioned below the inclined surface when the optical waveguide is placed with the outer surface down.

When an optical waveguide is used in an optical module, for example, the optical waveguide is connected with an optical device such as a vertical cavity surface emitting laser (VCSEL) that emits light in a vertical manner or a semiconductor photodiode that receives light in a vertical manner. In this case, there are problems such as: (1) loss of light attributed to displacement of the optical connection caused by deformation or warpage of the optical waveguide due to heat and humidity; and (2) loss of light due to the presence of an air layer between the optical waveguide and the optical device. In order to reduce the optical loss as mentioned above, an adhesive is used to bond the optical waveguide to the optical device, or to a package that fixes the optical device (fixing member).

When an adhesive is used for an optical waveguide having a reflective surface at an end thereof that is inclined at about 45° so as to utilize the difference in the refractive index of air and the refractive index of the waveguide core, there is a problem in that the refection loss may be increased due to the adhesive or foreign substances adhering to the reflective surface. In order to reduce the influences of the adhesion or foreign substances, there is a technique of providing a metal layer made of gold, silver or an alloy to the reflective surface so as to realize metallic reflection. However, when a photo-curable adhesive is used, the metal layer may hinder the radiation of light to the adhesive, thereby failing to sufficiently cure the adhesive that may result in insufficient adhesive strength. Further, since the formation of the metal film is carried out by a technique such as vacuum evaporation, sputtering or the like, a metal layer may also be formed on the side surface of the optical waveguide. Therefore, a sufficient amount of light to cure the photo-curable adhesive may not be obtained when irradiated with light from the side surface of the optical waveguide.

Moreover, when the optical waveguide is bonded to the optical device with an adhesive, the adhesive is typically applied prior to bonding the optical waveguide to the optical device. In this case, however, since a layer of the adhesive is present between the optical waveguide and the optical device, the distance between them is increased by an amount of the thickness of the adhesive layer. As a result, there is a problem in that the light propagating distance is increased to affect the optical coupling.

In order to address the above problem, there is a technique of feeding an adhesive into a portion at which the optical waveguide and the optical device are in contact with each other while pressing them against each other by applying a constant pressure. However, in this technique, since the optical waveguide and the optical device are physically in contact with each other with a constant pressure, feeding of the adhesive may not be carried out in a favorable manner, thereby failing to achieve sufficient adhesion strength.

In view of the aforementioned circumstances, the optical waveguide according to the present embodiment has a channel at a portion of an outer surface of the cladding, the outer surface forming an acute angle with the inclined surface, and the portion being positioned below the inclined surface when the optical waveguide is placed with the outer surface down. In this way, an adhesive may be fed into the channel by capillary action while the optical waveguide and the other device are pressed against each other with a constant pressure to contact each other. Further, the adhesive may be cured by irradiating with light from the opening of the channel, thereby ensuring the adhesion strength thereof. Moreover, since the area at which the optical waveguide is adhered with the adhesive is increased due to the shape of the channel, the adhesion strength may be increased.

<Channel>

The channel is formed on an outer surface of the cladding of the optical waveguide, and this outer surface forms an acute angle with the inclined surface (hereinafter, the "outer surface that forms an acute angle with the inclined surface" may be referred to as a "lower surface"). Further, the channel is positioned such that light entering the optical waveguide adjacent the channel (substantially perpendicularly to the lower surface) is reflected by the inclined surface into the waveguide core. In other words, the channel is positioned below the inclined surface when the optical waveguide is placed with the lower surface facing down.

The channel is formed at a portion at which the optical waveguide is bonded to another device (e.g., an optical device, specifically a surface emitting optical device, a semiconductor photodiode or the like) with an adhesive. For example, when an optical device is bonded to a portion of the lower surface of the optical waveguide that is below the inclined surface of the optical waveguide, the channel is formed at the portion at which the optical device is to be bonded.

Further, when the optical device is bonded to a portion of the lower surface of the optical waveguide that is below the inclined surface of the optical waveguide with an adhesive, for example, the channel may be formed in an upper direction from the lower surface of the optical waveguide.

The number of the channel may be more than one.

The direction of the channel depth may not be vertical to the surface to which a device is to be bonded.

The depth of the channel needs to be not more than the thickness of the cladding that forms the lower surface of the waveguide core. However, since the channel is filled with an adhesive by capillary action, the depth is preferably 20 µm or more, and more preferably 50 µm or more, in view of the filling speed.

The width of the channel is preferably 20 µm or more, and more preferably 50 µm or more, for the same reason as mentioned above.

The channel may be formed such that the end thereof extends to at least one edge in a width direction of the lower surface (in a direction perpendicular to the longitudinal direction).

Further, the channel may be formed such that both ends of the channel extend to both edges in a width direction of the lower surface (in a direction perpendicular to the longitudinal direction), namely, a continuous channel may be formed so as to extend from one edge to the opposite edge of the lower surface of the optical waveguide. By irradiating the photo-curable adhesive with light from both ends of the channel, the photo-curable adhesive may be efficiently irradiated with light and favorable adhesion between the optical waveguide and the other element may be realized.

<Optical Waveguide>

In the following, the optical waveguide according to the present embodiment will be described with reference to the drawings.

Figure 1B:
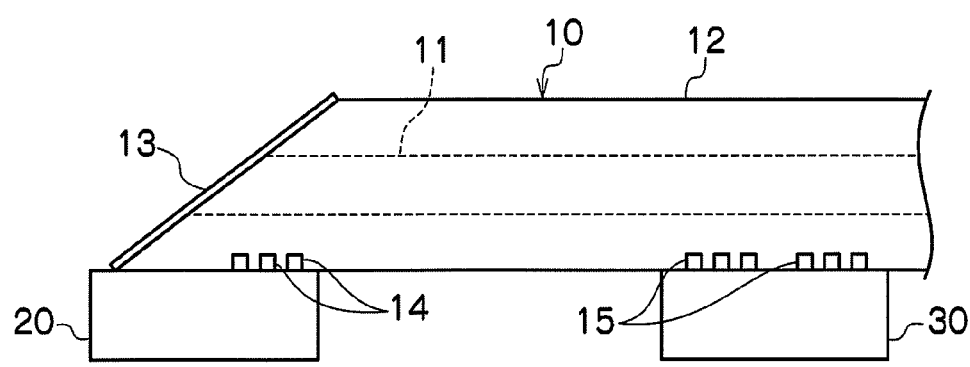
FIG. 1B is a side view of an exemplary embodiment of the optical waveguide according to the invention.
Figure 1C:
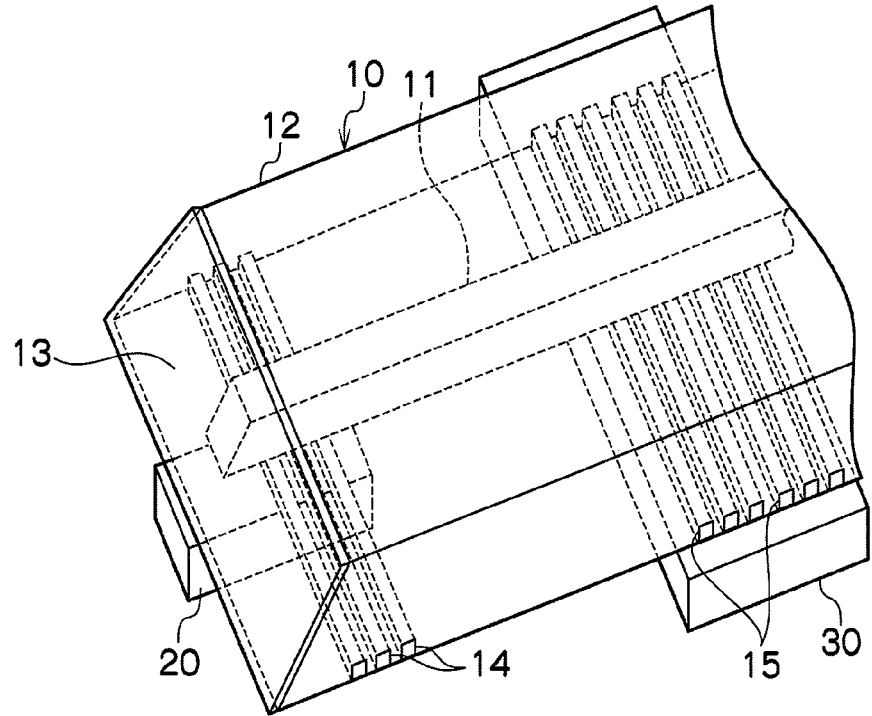
FIG. 1C is a perspective view of an exemplary embodiment of the optical waveguide according to the invention.

FIG. 1A is a top view of an exemplary embodiment of the optical waveguide according to the present embodiment, FIG. 1B is a side view of the same, and FIG. 1C is a perspective view of the same. As shown in FIGS. 1A to 1C, an optical waveguide 10 includes a waveguide core 11 that extends in a longitudinal direction of the waveguide (i.e., in a lateral direction in FIGS. 1A and 1B) and has a rectangular cross section, and a cladding 12 that surrounds waveguide core 11 and has a refractive index that is less than that of waveguide core 11. An inclined surface is formed at the end of optical waveguide 10 in a direction in which light travels (light propagating direction) (left side in FIGS. 1A and 1B), and a metal reflective surface 13 having a function of diverting the optical path is formed on the inclined surface.

Further, as shown in FIGS. 1A to 1C, an optical device 20 is bonded to a portion of the lower surface of optical waveguide 10 that is below metal reflective surface 13 (lower direction in FIG. 1B). Details of optical device 20 will be shown in the following description concerning an optical module. When optical device 20 is a light emitting device that emits light (such as a vertical cavity surface emitting laser (VCSEL) that oscillates light in a vertical direction), light is emitted from the light emitting device toward metal reflective surface 13 and is reflected at metal reflective surface 13 to divert the direction in which light propagates. As a result, the light propagates through waveguide core 11. On the other hand, when optical device 20 is a light receiving device that receives light (such as a semiconductor photodiode that receives light in a vertical direction), the light that has propagated through waveguide core 11 is reflected at metal reflective surface 13 and the direction in which light propagates is diverted toward the light receiving device. As a result, the light is received by the light receiving device.

Moreover, a fixing member 30 that fixes an optical module package is bonded to the lower surface of optical waveguide 1O. When optical device 20 and optical waveguide 10 are bonded to each other with a large bonding strength, fixing member 30 may not be provided.

Cladding 12 has a channel 14 at a portion of the lower surface of optical waveguide 10 to which optical device 20 is to be bonded, and channel 14 is filled with an adhesive. Further, cladding 12 also has a channel 15 at a portion of the lower surface of optical waveguide 10 to which fixing member 30 is to be bonded, and channel 15 is filled with an adhesive.

(Waveguide Core and Cladding)

The type of optical waveguide 10 is not particularly limited, and may be a silica waveguide including a waveguide core or a cladding made of quartz, a polymer optical waveguide including a waveguide core or a cladding made of a polymer, or the like. In view of ease of forming channels 14 and 15 or flexibility of the optical module, optical waveguide 10 is preferably a polymer optical waveguide.

Waveguide core 11, which is formed inside optical waveguide 10, has a refractive index that is higher than that of cladding 12 that surrounds waveguide core 11. The difference between the refractive index of waveguide core 11 and the refractive index of cladding 12 is preferably from 0.3% to 5%.

The material for cladding 12 is not particularly limited as long as it has a refractive index that is less than that of waveguide core 11, and may be selected according to the application in view of its optical properties such as a refractive index or light transmittance, mechanical strength, heat resistance, flexibility, or the like. For example, the material may be a resin that is cured by radiation rays or electron beams, preferably an ultraviolet curing resin, which is preferably an ultraviolet curable monomer or oligomer, or a mixture thereof.

Specific examples of the material for cladding 12 include an epoxy resin, an acrylic resin (e.g., polymethyl methacrylate), an alicyclic acrylic resin, a styrene resin (e.g., polystyrene and an acrylonitrile styrene copolymer), an olefin resin (e.g., polyethylene, polypropylene, and an ethylene propylene copolymer), an alicyclic olefin resin, a vinyl chloride resin, a vinylidene chloride resin, a vinyl alcohol resin, a vinyl butyral resin, an arylate resin, a fluorine-containing resin, a polyester resin (e.g., polyethylene terephthalate and polyethylene naphthalate), a polycarbonate resin, cellulose diacetate, cellulose triacetate, an amide resin (e.g., aliphatic polyamide and aromatic polyamide), an imide resin, a sulfone resin, a polyether sulfone resin, a polyether ether ketone resin, a polyphenylene sulfide resin, a polyoxymethylene resin, or a blend of the above-mentioned resins.

Waveguide core 11 may be formed from an ultraviolet curable resin, preferably an ultraviolet curable monomer or oligomer, or a mixture thereof. Specific examples of the material for waveguide core 11 include an epoxy ultraviolet curable resin, an acrylic ultraviolet curable resin, and the like.

(Inclined Surface and Metal Reflective Layer)

The inclined surface shown in FIGS. 1A to 1C forms an angle of 45° with respect to the longitudinal direction of waveguide core 11.

Metal reflective surface 13 is a metal mirror formed from a metal film. The metal is preferably at least one of gold, silver, copper or aluminum. Among these, silver or an alloy thereof is preferable in terms of cost and reflection efficiency.

Metal reflective surface 13 may be formed by a known deposition method, such as sputtering or vacuum evaporation. The thickness of metal reflective surface 13 is preferably from 50 nm to 300 nm, and more preferably from 70 nm to 200 nm.

The type of the optical waveguide according to the present embodiment is not limited insofar as the above-described properties are satisfied, but is preferably a polymer optical waveguide film having flexibility.

The polymer optical waveguide film is formed from a transparent resin film having flexibility, and has a capability of following deformation such as "bending" or "twisting".

In order to improve the capability of following deformation, the thickness of the polymer optical waveguide film is preferably from 50 μm to 500 μm, more preferably from 70 μm to 300 μm. For the same reason as mentioned above, the width of the film is preferably from 0.25 mm to 10 mm, and more preferably from 0.5 mm to 3 mm.

(Optical Waveguide Production Method)

In the following, the method of producing an optical waveguide according to the present embodiment will be described, taking a polymer optical waveguide as an example. The optical waveguide may be produced through the following processes (I) and (II), and process (I) further includes the following steps (I-i) to (I-iv).

(I) Formation of optical waveguide
(I-i) Preparation of optical waveguide
(I-ii) Formation of optical waveguide outline
(I-iii) Formation of inclined surface at the end of optical waveguide
(I-iv) Formation of reflective layer on inclined surface
(II) Formation of channel
(I) Formation of Optical Waveguide
(I-i) Preparation of Optical Waveguide For the preparation of an optical waveguide, several methods including the following have been proposed.

(a) A method including impregnating a film with a monomer, selectively exposing a waveguide core to light to change the refractive index thereof, and then laminating the film to the waveguide core (selective polymerization method)

(b) A method including applying a waveguide core and a cladding, and then forming the cladding by a reactive ion etching method (RIE method)

(c) A method including exposing an ultraviolet curable resin prepared by adding a photosensitive material to a polymeric material to light, and developing the same by a photolithography method (direct exposing method)

(d) A method utilizing injection molding (e) A method including applying a waveguide core and a cladding, and then exposing the waveguide core to light to change its refractive index (photo-bleaching method)

Further, Japanese Patent Application Laid-Open (JP-A) No. 2004-226941 proposes a method of producing a polymer optical waveguide using a mold. In the following, the method using a mold will be described in detail as an example.

The polymer optical waveguide may be produced, for example, by the following processes (1) to (5).

(1) Preparing a mold made of a cured layer of a mold-forming curable resin, the mold having a concave portion that corresponds to the shape of a waveguide core and at least two through holes including one communicating with one end of the concave portion and one communicating with the other end of the concave portion (2) Adhering a cladding flexible film base (cladding film) to the mold, the cladding film being capable of tightly adhering to the mold (3) Filling the concave portion of the mold with a core-forming curable resin by feeding the core-forming curable resin into the through hole at one end of the concave portion of the mold to which the cladding film has been adhered, and vacuum-suctioning the resin from the through hole at the other end of the concave portion of the mold (4) Curing the core-forming curable resin in the concave portion, and separating the mold from the cladding film (5) Forming an upper cladding on the cladding film on which an waveguide core has been formed For the purpose of simplification, a method of producing a polymer optical waveguide having one waveguide core will be described with reference to FIGS. 2A to 2G.

Figure 2A:
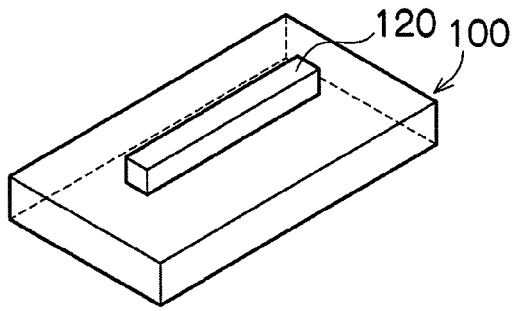
FIGS. 2A to 2G are views of an exemplary embodiment of the method of producing an optical waveguide according to the invention.
Figure 2B:
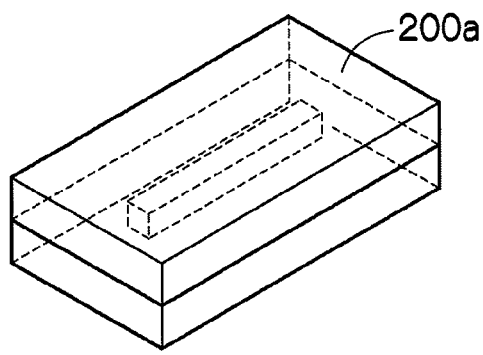
Figure 2C:
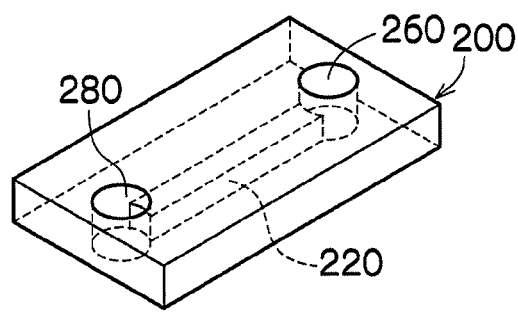

FIG. 2A shows a master 100 and a convex portion 120 that corresponds to the shape of a waveguide core. First, a mold-forming curable resin is applied onto the surface of master 100 having convex portion 120, and is then cured to form a cured resin layer 200a (see FIG. 2B). After separating master 100, cured resin layer 200a having a concave portion 220 is obtained (not shown). A mold 200 is obtained by forming through holes 260 and 280, each communicating with each end of concave portion 220 of cured resin layer 200a, by punching or the like (see FIG. 2C).

Figure 2D:
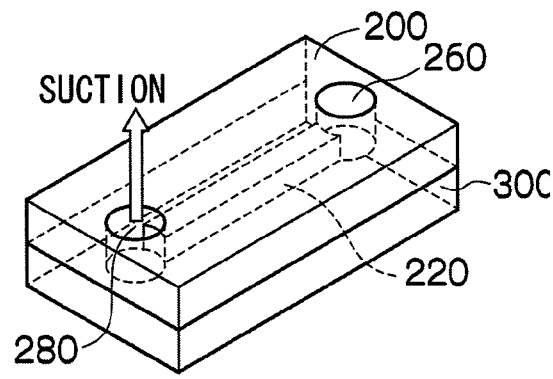
Figure 2E:
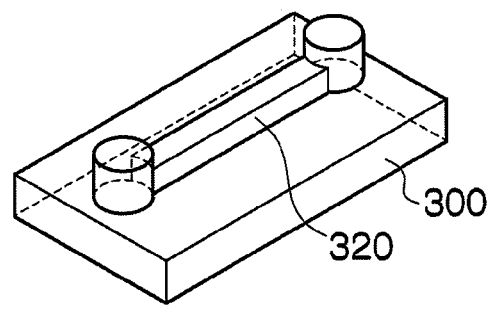
Figure 2F:
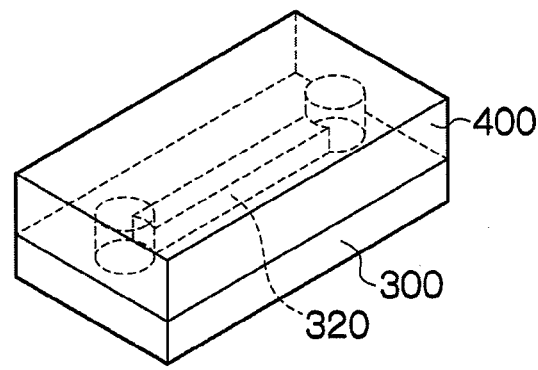
Figure 2G:
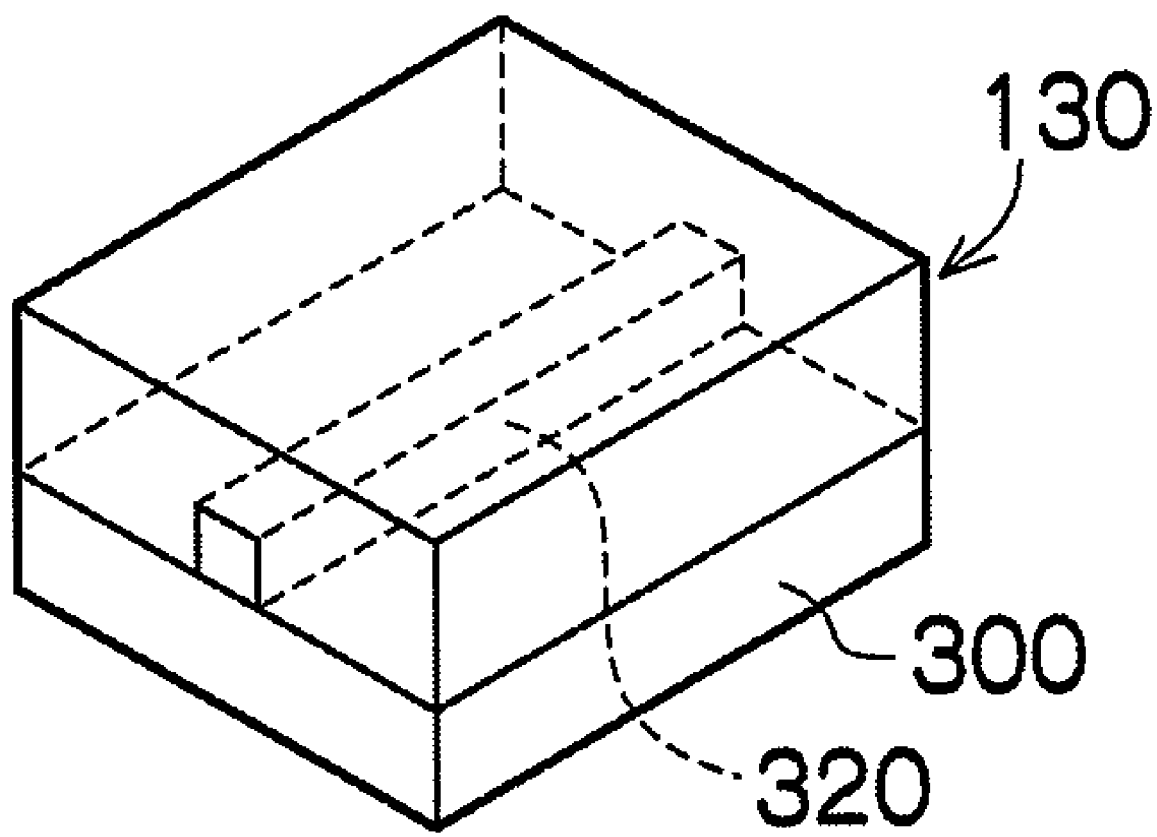

Next, as shown in FIG. 2D, a cladding film 300 is adhered to mold 200. Thereafter, a core-forming curable resin is fed into through hole 260 and is vacuum-suctioned from through hole 280, thereby filling concave portion 220 with the core-forming curable resin. After curing the resin and separating mold 200, cladding film 300 on which a waveguide core 320 is formed is obtained as shown in FIG. 2E. Next, a cladding (upper cladding) 400 is formed on cladding film 300 (see FIG. 2F), and portions corresponding through holes 260 and 280 filled with a cured resin are cut off with a dicing saw or the like, thereby obtaining a polymer optical waveguide 130 (see FIG. 2G).

The size of the concave portion that corresponds to the waveguide core to be formed may be determined according to the application of the optical waveguide or the like. For example, in the case of a single-mode optical waveguide, a core having the size of about 10 μm per side is generally used. In the case of a multi-mode optical waveguide, a core having the size of about 30 μm to about 150 μm per side is generally used.

As the mold-forming curable resin, curable organopolysiloxane that forms silicone rubber (silicone elastomer) or silicone resin after curing may be preferably used. The curable organopolysiloxane is preferably those having a methyl siloxane group, an ethyl siloxane group, or a phenyl siloxane group in the molecule. The curable organopolysiloxane may be either a one-component curable organopolysiloxane or a two-component curable organopolysiloxane that is used in combination with a curing agent. Moreover, the curable organopolysiloxane may be a thermosetting organopolysiloxane or an organopolysiloxane that cures at room temperature (e.g., organopolysiloxane that cures by moisture in the air), or other type of organopolysiloxane that cures by ultraviolet curing or the like.

The curable organopolysiloxane that forms silicone rubber after curing is preferable, and a so-called liquid silicone rubber (a material having a high viscosity such as a paste is included in the "liquid" herein) is typically used. The liquid silicone rubber is preferably a two-component liquid silicone rubber that is used in combination with a curing agent, and an addition-type liquid silicone rubber is more preferable.

Among the liquid silicone rubbers, a liquid dimethylsiloxane rubber is particularly preferable. A cured product obtained from liquid dimethylsiloxane rubber generally has a refractive index of as low as about 1.43. Therefore, a mold formed from this cured product may be used as a cladding as it is, without separating it from the cladding base. In this case, it is necessary to ensure that the mold does not separate from the core-forming resin and the cladding base.

The material of the cladding flexible film base may be selected according to the application of the optical device, in view of optical properties such as a refractive index or light transmittance, mechanical strength, heat resistance, adhesiveness to a mold, flexibility, or the like. Examples of the film include an alicyclic acrylic resin film, an alicyclic olefin resin film, a cellulose triacetate film, and a fluorine-containing resin film. In order to secure the difference between the refractive index of the core and the refractive index of the film base, the film base preferably has a refractive index of less than 1.55, and more preferably less than 1.53.

Examples of the alicyclic acrylic resin film include those having an alicyclic hydrocarbon such as tricyclodecane that has been introduced into an ester substituent, such as OZ-1000 (trade name), OZ-1100 (trade name) or the like (manufactured by Hitachi Chemical Co., Ltd.).

Examples of the alicyclic olefin resin film include those having a norbornene structure in the main chain, and those having a norbornene structure in the main chain and a polar group such as an alkyloxy carbonyl group in a side chain (examples of the alkyl group include an alkyl group having 1 to 6 carbon atoms and a cycloalkyl group). Among these, the alicyclic olefin resin having a norbornene structure in the main chain and a polar group such as an alkyloxy carbonyl group in a side chain is suitable for the production of the optical waveguide according to the present embodiment.

The thickness of the film base may be determined in view of flexibility, rigidity, handleability or the like, and is generally preferably from 0.02 mm to 0.2 mm.

(I-ii) Formation of Optical Waveguide Outline

For the formation of the outline of the optical waveguide, a method of using a rotating blade for cutting is commonly known. This method may be preferably employed because an optically favorable flat surface may be formed and the outline may be formed with a submicron-level precision.

Examples of an apparatus equipped with such a rotating blade include DAD321 (trade name), manufactured by Disco Corporation.

(I-iii) Formation of Inclined Surface at the End of Optical Waveguide

A method of using a dicing saw with a rotating tapered blade is widely known as a method of simply and highly efficiently forming an inclined surface to which a reflective surface for diverting the optical path is to be formed. In addition, a method of using laser beams or the like is also proposed. However, considering the flatness of the inclined surface, the method of using a dicing saw may be preferably selected.

Examples of the dicing blade with an angled blade include a 45° tapered blade, manufactured by Disco Corporation.

(I-iv) Formation of Metal Layer (Metal Mirror) on Inclined Surface

Subsequently, a metal layer is formed on the inclined surface. The method of forming a metal layer is not particularly limited, and examples thereof include a method of attaching a metal piece to the inclined surface, and a method of depositing metal particles onto the inclined surface by sputtering or vacuum evaporation. Among these, the method of depositing metal particles to the inclined surface by sputtering or vacuum evaporation may be preferably selected.

The metal is not particularly limited and may be gold, silver, copper, aluminum or the like, but silver may be preferably selected.

(II) Formation of Channel

Next, a channel is formed at a portion of the lower surface of the cladding that is positioned below the inclined surface. The channel may be formed, for example, by bonding the upper surface of the optical waveguide to a fixing sheet and placing the same, with the lower surface facing up, on a sample stand of a dicing saw having a rotating blade, and then cutting the same. The cutting is carried out in such a manner that the edge of the blade is positioned above the waveguide core. This method enables carrying out the cutting process by scanning with the dicing saw not only in a horizontal direction with a submicron-level precision, but also in a vertical direction with a micron-level precision.

Additionally, since plural channels may be easily formed in a short period of time by using the dicing saw, this method is suitable for mass production.

Examples of the dicing saw having a rotating blade include DAD321, trade name, manufactured by Disco Corporation.

The thickness of the cladding that forms the lower side of the optical waveguide (thickness from the lower surface to the waveguide core) needs to be as thin as possible, considering bonding efficiency to the optical device. On the other hand, the cladding at the lower side needs to have a certain amount of thickness, typically 20 μm or more, considering strength and environmental resistance of the optical waveguide. Since the blade of dicing saw has a height accuracy of 5 μm or lower, a channel may be formed only at the cladding.

Through the above-described processes, the optical waveguide according to the present embodiment may be produced.

<Optical Module>

The optical module according to the present embodiment includes the optical waveguide as mentioned above, an optical device, and a photo-curable adhesive that fills the channel of the optical waveguide and bonds the optical device to the optical waveguide.

(Method of Producing Optical Module)

In the following, the method of producing an optical module, which is formed from a combination of an optical waveguide and an optical device, will be described. The optical module according to the present embodiment is produced by: (a) a step of producing an optical waveguide; (b) a step of filling the channel of the optical waveguide with an adhesive; and (c) a step of curing the adhesive.

The production of the optical waveguide may be conducted in accordance with the aforementioned method, for example.

(b) Step of Filling Channel with Adhesive

In the step of filling the channel with an adhesive, it is preferable to feed the adhesive into the channel while contacting the optical device to the optical waveguide produced in step (a), at a portion at which the channel is formed.

For example, when optical waveguide 10 and optical device 20 shown in FIGS. 1A to FIG. 1C are bonded to each other, an adhesive may be dropped onto channel 14 so as to fill channel 14 with the adhesive by capillary action while pressing optical device 20 against cladding 12 at a portion at which channel 14 is formed with a constant pressure. When optical device 20 is a light emitting device, it is preferable that the light emitting point and the waveguide core are optically aligned with each other when optical device 20 is pressed against optical waveguide 10. On the other hand, when optical device 20 is a light receiving device, it is preferable that the light receiving point and the waveguide core are optically aligned with each other when optical device 20 is pressed against optical waveguide 10.

The step of filling the channel with an adhesive may also be conducted by applying the adhesive onto a portion of optical waveguide 10 at which channel 14 is formed (or a portion to which optical device 20 is to be bonded) prior to bonding optical device 20 to optical waveguide 10. However, the above-described method of feeding an adhesive into channel 14 by capillary action while contacting optical device 20 to a portion of optical waveguide 10 at which channel 14 is formed is particularly preferable.

By selecting an ultraviolet curable resin as the material for the cladding of optical waveguide and selecting the same ultraviolet curable resin for the adhesive, favorable adhesive strength may be obtained and the loss due to the difference in refractive index may be suppressed. From the viewpoint of suppressing the loss due to the difference in refractive indexes, the same ultraviolet curable resin as that used for the waveguide core may be used for the adhesive.

The difference between the refractive index of the adhesive and the refractive index of the cladding is preferably 10% or less, and more preferably 3% or less. The above difference may be adjusted by selecting each material for the adhesive, cladding and waveguide core.

(c) Step of Curing Adhesive

The curing of a photo curable adhesive may be carried out by irradiating the adhesive with light (e.g., when the adhesive is ultraviolet curable, ultraviolet rays are used for the curing). When the adhesive is irradiated with light from both ends of the channel, the adhesive may be efficiently irradiated with light, and thus the adhesive may be more efficiently cured to secure an adhesive strength.

Through the above-described processes, the optical module formed from the optical waveguide and the optical device may be produced.

(Optical Module)

In the following, the optical module according to the present embodiment will be described with reference to the drawings.

Figure 3:
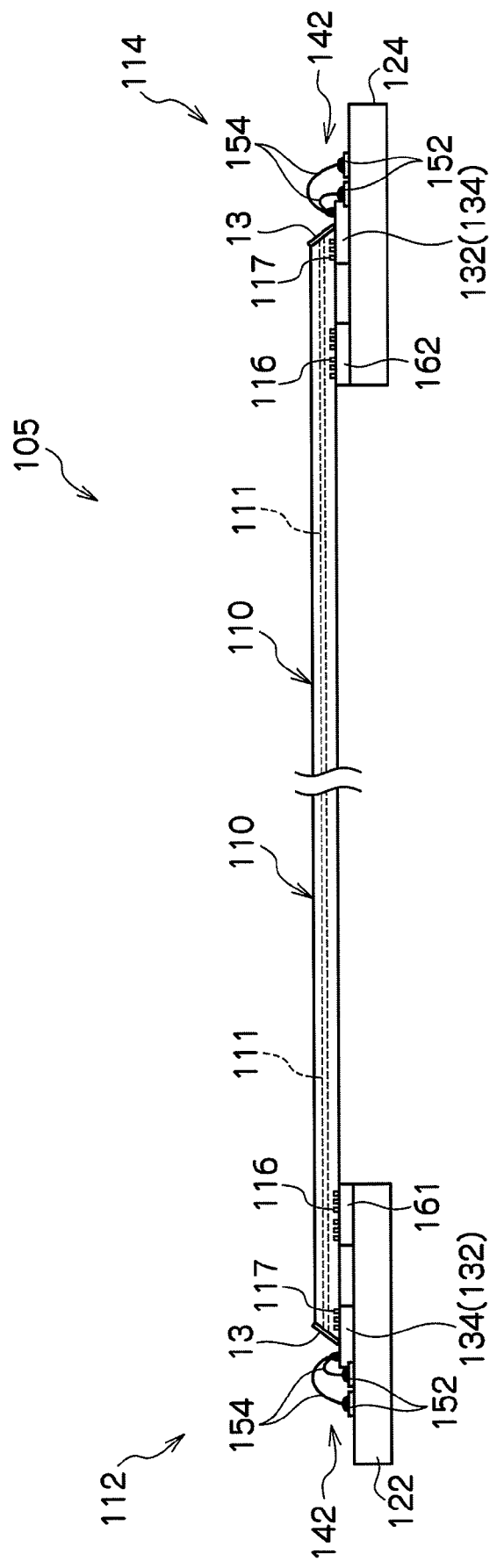
FIG. 3 is a side view of an exemplary embodiment of the optical module according to the invention.
Figure 4:
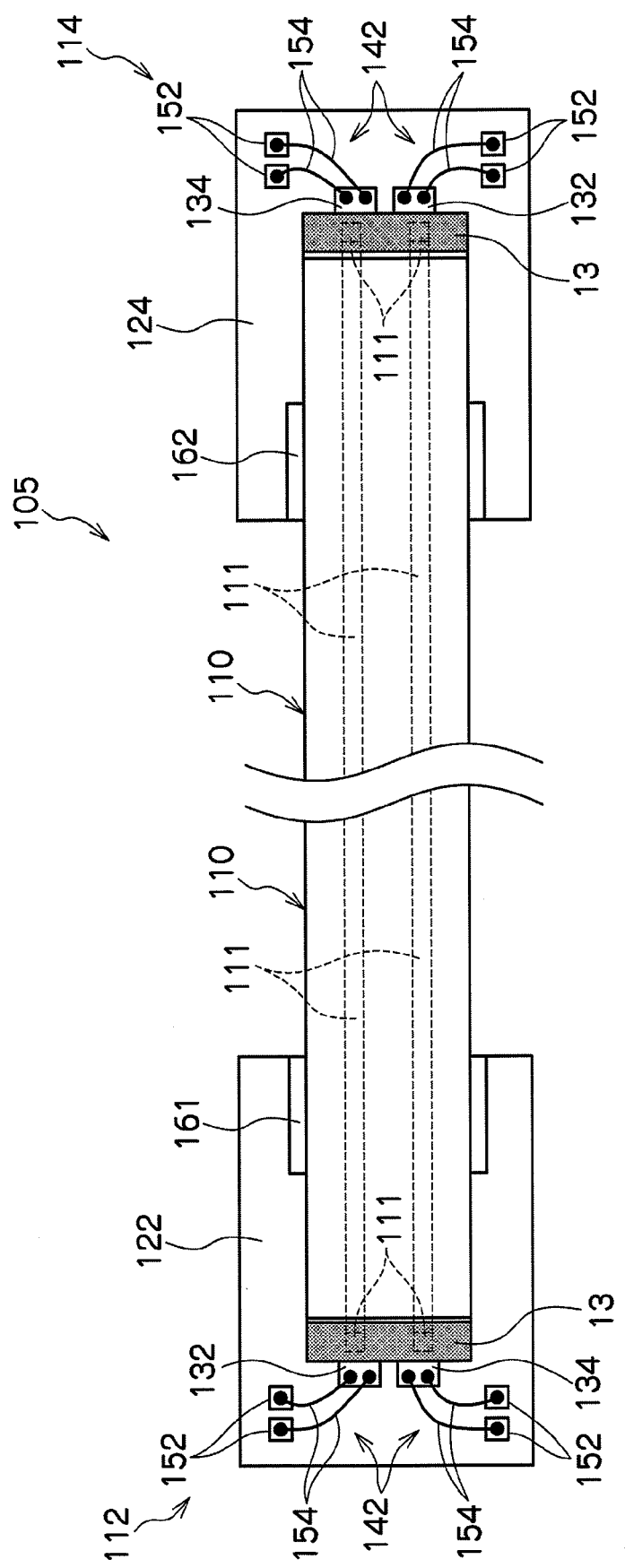
FIG. 4 is a plan view of an exemplary embodiment of the optical module according to the invention.

FIG. 3 is a side view of the optical module according to the present embodiment, and FIG. 4 is a plan view of the same. An optical module 105 according to the present embodiment includes a slab-shaped optical waveguide 110, and a light emitting/receiving units 112 and 114 that emit and receive light via an optical waveguide core 111 formed in optical waveguide 110, as shown in FIGS. 3 and 4. Optical waveguide 110 as described above may be used as optical waveguide 110 according to the present embodiment.

Light emitting/receiving unit 112 has a holding substrate 122 and a waveguide fixing member 161 that support one end of optical waveguide 110. On the other hand, light emitting/receiving unit 114 has a holding substrate 124 and a waveguide fixing member 162 that support the other end of optical waveguide 110.

Holding substrates 122 and 124 each include an optical device 134, a light emitting device 132, and a connecting line 154 that transmits and receives a signal from these devices. Although not shown in the drawing, light receiving device 134 and light emitting device 132 may be provided with a signal amplification circuit and a light emitting device-driving circuit.

In the present embodiment, optical waveguide 110 that transmits an optical signal from light emitting/receiving unit 112 is described as an optical waveguide for transmission, while optical waveguide 110 that receives an optical signal at light emitting/receiving unit 112 is described as an optical waveguide for reception. The above relationship may be defined in an inverted manner when viewed from light emitting/receiving unit 114.

Light emitting/receiving unit 112 may be formed by, for example, attaching light emitting device 132 and light receiving device 134 to holding substrate 122 with a flip chip bonder or the like. Then, optical waveguide 110 is attached to light emitting device 132 and light receiving device 134 with a flip chip bonder or the like. Thereafter, light emitting device 132 and light receiving device 134 are connected to an electrode 152 using wires 154.

Further, light emitting/receiving units 112 and 114 have waveguide fixing members 161 and 162 that fix optical waveguide 110, and optical waveguide 110 has channels 116 at portions of its surface (cladding) to which waveguide fixing members 161 and 162 are contacted. Channels 116 are filled with an adhesive that fixes waveguide fixing members 161 and 162 to optical waveguide 110.

Optical waveguide 110 has channels 117 at portions of its surface (cladding) to which light emitting device 132 and light receiving device 134 are contacted, and channels 117 are filled with an adhesive that fixes light emitting device 132 and light receiving device 134 to optical waveguide 110. In this way, optical waveguide 110 is supported.

Next, the action of optical module 105 according to the present embodiment will be described. In the following, the optical waveguide that transmits an optical signal from light emitting/receiving unit 112 is described as an optical waveguide for transmission, and the optical waveguide that receives an optical signal at light emitting/receiving unit 112 is described as an optical waveguide for reception.

In optical module 105 according to the present embodiment, when an optical signal is transmitted from light emitting/receiving unit 112 to light emitting/receiving unit 114, light that has been emitted from light emitting element 132, which is held by holding substrate 122 of light emitting/receiving unit 112, is coupled with the incident end surface of waveguide core for transmission 111 that is provided inside optical waveguide 110. Then, the light that has been emitted from an emitting end surface of waveguide core for transmission 111 is received at light receiving element 134 that is held by holding substrate 124 of light emitting/receiving unit 114.

When an optical signal transmitted from light emitting/receiving unit 114 is received at light emitting/receiving unit 112, light that has been emitted from light emitting element 132, which is held by holding substrate 124 of light emitting/receiving unit 114, is coupled with the incident end surface of waveguide core for reception 111. Then, the light that has been emitted from the emitting end surface of waveguide core for reception 111 is received by light receiving element 134 that is held by holding substrate 122 of light emitting/receiving unit 112.

The above embodiment is describes as an optical module that performs bidirectional optical communication at a light emitting/receiving unit that includes both a light emitting element and a light receiving element. However, an optical module that performs one-way optical communication between a light transmitting unit having a light emitting element and a light receiving unit having a light receiving element is also within the scope of the embodiment.

EXAMPLES

Hereinafter, the present embodiment will be described in more detail with reference to the following Examples, but the present embodiment is not limited thereto.

Example 1

(Production of Optical Waveguide)
Preparation of Master

A thick film resist (SU-8) is applied onto a silicon substrate by spin coating, and is pre-baked at 80° C., exposed to light through a photomask and then developed, thereby forming a convex portion for forming a core on the silicon substrate. The convex portion has a shape that corresponds to the shape of a waveguide core (width: 50 μm, height: 50 μm, length: 90 mm). Then, the resultant is post-baked at 120° C., thereby obtaining a master for producing an optical waveguide.

Preparation of Mold

Next, a release agent is applied onto the master, and a mixture of a thermosetting dimethylsiloxane resin (trade name: SYLGARD184, manufactured by Dow Corning Asia Ltd.) and a curing agent for the same is cast onto the release agent. The resultant is subjected to vacuum defoaming for 10 minutes, and is heated for 30 minutes at 120° C. to cure. Thereafter, the master is separated to obtain a mold having a concave portion for forming a core.

Further, a through hole having a diameter of 3 mm is formed by punching at each end of the concave portion so as to communicate with the concave portion, thereby obtaining a mold having a feeding port and a suctioning port.

Formation of Waveguide Core

A cladding film base (ARTON FILM, trade name, manufactured by JSR Corp., refractive index: 1.51) having a thickness of 100 μm is adhered to the mold as a lower cladding base. Then, an ultraviolet curable resin having a viscosity of 800 m·Pas (epoxy based resin, refractive index after curing: 1.54) is fed into the concave portion from the feeding port of the mold and is vaccum-suctioned from the suctioning port of the mold, thereby filling the concave portion with the ultraviolet curable resin. Subsequently, the resin is irradiated with ultraviolet rays of 50 mW/cm$^2$ through the mold for 10 minutes to cure. Thereafter, the mold is separated from the lower cladding base, thereby forming a waveguide core on the lower cladding base. The waveguide core has the same shape as that of the convex portion of the master.

Formation of Cladding

Next, an ultraviolet curable resin (acryl base, viscosity at 25° C.: 360 mPa·s) having a refractive index after curing of 1.51, which is the same as that of the ARTON FILM, is dropped onto the surface of the lower cladding base on which the waveguide core has been formed, and a cladding film base (ARTON FILM, manufactured by JSR Corp., refractive index: 1.51, film thickness: 100 μm) is adhered thereto as an upper cladding base. Thereafter, the resultant was irradiated with ultraviolet rays of 50 mW/cm$^2$ for 10 minutes to cure the ultraviolet curable resin. The cladding is thus obtained.

Formation of Outline

The end of the optical waveguide is cut with a dicing saw having a rectangular diamond blade (trade name: DAD321, manufactured by Disco Corporation) to form an end of the optical waveguide.

Formation of Inclined Surface

Next, the end of the optical waveguide is cut using a dicing saw having a 45° angled dicing blade (manufactured by Disco Corporation) to form a surface that is inclined at an angle of 45°. The inclined surface diverts the optical path of propagating light at 90° in a vertical direction.

Formation of Metal Reflective Layer

A metal film is formed on the inclined surface by an RF magnetron sputtering apparatus (manufactured by ULVAC, Inc.) using silver as a target. As a by-product, a metal film is also formed on the upper and side surfaces of the optical waveguide in the vicinity of the end of the optical waveguide.

Formation of Channel

The upper surface of the optical waveguide is attached to a fixing sheet for dicing, and the optical waveguide is positioned with the lower surface facing up. Subsequently, channels having a depth of 50 μm and a width of 80 μm are formed at a portion of the lower surface that is positioned below the inclined surface (a portion to which a VCSEL is to be attached in the subsequent process), and at a portion to which a waveguide fixing member is to be attached. Specifically, the channels are formed by contacting a dicing saw having a rotating diamond blade having a width of 80 μm (trade name: DAD321, manufactured by Disco Corporation) to the lower surface (lower cladding) of the optical waveguide from above. 15 channels are formed so as to extend over the lower surface of the optical waveguide in a width direction at an interval of 200 μm, in a direction perpendicular to the lower surface of the optical waveguide.

(Preparation of Optical Module)

Feeding of Adhesive

First, the upper side of the optical waveguide obtained in the above process is suctioned by a vacuum pickup collet. Subsequently, the optical waveguide and a VCSEL (manufactured by Fuji Xerox Co., Ltd., wavelength: 850 nm) are adjusted so that the light emitting point and the waveguide core are optically aligned with each other, and then a portion of the optical waveguide having the channels and the VCSEL are pressed against each other with a pressure of 0.5 N. Further, a portion of the optical waveguide having the channels and the waveguide fixing member are pressed against each other with a pressure of 0.5 N.

Subsequently, while continuing the pressing, an ultraviolet curable resin (acryl base, viscosity at 25° C.: 360 mPa·s), which is the same as the resin used for the formation of the cladding, is dropped onto one end of spaces formed by the waveguide fixing member and the channels of the optical waveguide, and spaces formed by the VCSEL and the channels of the optical waveguide. The spaces are filled with the adhesive (ultraviolet curable resin) by capillary action.

Curing of Adhesive

While continuing the pressing with a pressure of 0.5 N, the adhesive (ultraviolet curable resin) is cured by irradiating with ultraviolet rays (40 mW/cm$^2$) from both sides of the optical waveguide (both ends of the channels) for 90 seconds.

A light-emitting module is thus obtained.

(Evaluation of Light Propagation and Adhesive Strength of Optical Waveguide)

The VCSEL that has been coupled with the optical waveguide is driven at 2 mA. As a result, the light intensity at the end of the optical waveguide is −1.5 dBm, indicating that light propagation is achieved.

Subsequently, a tensile force is applied to the end of the optical waveguide to which the VCSEL has been bonded. As a result, the bonding portion is broken at 6.3 N.

Comparative Example 1

(Preparation of Optical Waveguide)

An optical waveguide is produced by the method according to Example 1, except that channels are not formed on the optical waveguide.

(Preparation of Optical Module)

The optical waveguide was pressed against a VCSEL (manufactured by Fuji Xerox Co., Ltd., wavelength: 850 nm) and against a waveguide fixing member with a pressure of 0.5 N. Then, an ultraviolet curable resin (acryl base, viscosity at 25° C.: 360 mPa·s), which is the same resin as that used for the formation of the cladding in Example 1, is dropped onto portions around the VCSEL and the waveguide fixing member, while continuing the pressing. Subsequently, the adhesive (ultraviolet curable resin) is cured by irradiating with ultraviolet rays (40 mW/cm$^2$) for 90 seconds, while still continuing the pressing. A light-emitting module is thus obtained.

(Evaluation of Light Propagation and Adhesive Strength of Optical Waveguide)

The light intensity at the end of the optical waveguide is measured in accordance with the evaluation method of Example 1. As a result, the light intensity is −2.1 dBm.

Subsequently, a tensile force is applied to the end of the optical waveguide to which the VCSEL has been bonded. As a result, the bonding portion is broken at 3.1 N.

All publications, patent applications, and technical standards mentioned in this specification are herein incorporated by reference to the same extent as if each individual publication, patent application, or technical standard was specifically and individually indicated to be incorporated by reference.

What is claimed is:

1. An optical waveguide comprising:
    a waveguide core through which light propagates;
    a cladding that surrounds the waveguide core and has a refractive index that is less than the refractive index of the waveguide core;
    a metal layer that is formed on a surface of at least one end of the optical waveguide in a longitudinal direction, the surface being inclined so as not to be perpendicular to the longitudinal direction;
    and a channel that is formed at a portion of an outer surface of the cladding, the outer surface forming an acute angle with the inclined surface, and the channel being positioned below the inclined surface when the optical waveguide is placed with the outer surface facing down,
    wherein the channel is formed so as to extend to at least one edge in a width direction of the outer surface of the cladding that forms an acute angle with the inclined surface.

2. The optical waveguide according to claim 1, wherein the optical waveguide is formed from a flexible material.

3. An optical module comprising an optical waveguide, an optical device, and a photo-curable adhesive, the waveguide comprising:
    a waveguide core through which light propagates;
    a cladding that surrounds the waveguide core and has a refractive index that is less than the refractive index of the waveguide core;
    a metal layer that is formed on a surface of at least one end of the optical waveguide in a longitudinal direction, the surface being inclined so as not to be perpendicular to the longitudinal direction;
    and a channel that is formed at a portion of an outer surface of the cladding, the outer surface forming an acute angle with the inclined surface, and the channel being positioned below the inclined surface when the optical waveguide is placed with the outer surface facing down, and the photo-curable adhesive filling the channel and bonding the optical waveguide and the optical device,
    wherein the channel is formed so as to extend to at least one edge in a width direction of the outer surface of the cladding that forms an acute angle with the inclined surface.

4. The optical module according to claim 3, wherein the photo-curable adhesive is formed from an ultraviolet curable resin.

5. A method of producing an optical module, the method comprising:
    producing an optical waveguide comprising a waveguide core through which light propagates; a cladding that surrounds the waveguide core and has a refractive index that is less than the refractive index of the waveguide core; a metal layer that is formed on a surface of at least one end of the optical waveguide in a longitudinal direction, the surface being inclined so as not to be perpendicular to the longitudinal direction; and a channel that is formed at a portion of an outer surface of the cladding, the outer surface forming an acute angle with the inclined surface, and the channel being positioned below the inclined surface when the optical waveguide is placed with the outer surface facing down,
    wherein the channel is formed so as to extend to at least one edge in a width direction of the outer surface of the cladding that forms an acute angle with the inclined surface, contacting an optical device to a portion of the optical waveguide at which the channel is formed, and filling the channel with a photo-curable adhesive by capillary action during the contacting, and curing the photo-curable adhesive by exposing it to light.

6. The method according to claim 5, wherein the photo-curable adhesive is formed from an ultraviolet curable resin.

7. A method of producing an optical waveguide, the method comprising:

producing the optical waveguide comprising a waveguide core through which light propagates; a cladding that surrounds the waveguide core and has a refractive index that is less than the refractive index of the waveguide core; and a metal layer that is formed on a surface of at least one end of the optical waveguide in a longitudinal direction, the surface being inclined so as not to be perpendicular to the longitudinal direction, and forming a channel by cutting a portion of an outer surface of the cladding by contacting a rotating blade thereto, the outer surface forming an acute angle with the inclined surface, and the channel being positioned below the inclined surface when the optical waveguide is placed with the outer surface facing down, wherein the channel is formed so as to extend to least one edge in a width direction of the outer surface of the cladding that forms an acute angle with the inclined surface.

8. The method according to claim 7, wherein the optical waveguide is formed from a flexible material.

* * * * *